United States Patent
Fukumoto et al.

(10) Patent No.: US 11,780,384 B2
(45) Date of Patent: Oct. 10, 2023

(54) AUTOMOBILE SOUND INSULATION PANEL (71) Applicant: KASAI KOGYO CO., LTD., Kanagawa (JP)

(72) Inventors: Ichiro Fukumoto, Kodaira (JP); Takafumi Ito, Isehara (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 453 days.

(21) Appl. No.: 17/056,871

(22) PCT Filed: Sep. 25, 2018

(86) PCT No.: PCT/JP2018/035328
§ 371 (c)(1),
(2) Date: Nov. 19, 2020

(87) PCT Pub. No.: WO2020/065705
PCT Pub. Date: Apr. 2, 2020

(65) Prior Publication Data
US 2021/0146861 A1 May 20, 2021

(51) Int. Cl.
*B60R 13/08* (2006.01)
*G10K 11/168* (2006.01)
*G10K 11/172* (2006.01)

(52) U.S. Cl.
CPC ............ *B60R 13/08* (2013.01); *G10K 11/168* (2013.01); *G10K 11/172* (2013.01)

(58) Field of Classification Search
CPC ..... B60R 13/08; G10K 11/168; G10K 11/172
See application file for complete search history.

(56) References Cited

U.S. PATENT DOCUMENTS 4,335,802 A * 6/1982 Kirschner ............ G10K 11/168
181/290
7,448,353 B2 * 11/2008 Shinada ............... F02M 35/161
123/184.53
(Continued)

FOREIGN PATENT DOCUMENTS

EP 1039443 A2 9/2000
JP 2000-326430 A 11/2000
(Continued)

OTHER PUBLICATIONS

International Search Report for International Application No. PCT/JP2018/035328 dated Dec. 4, 2018, Japan, 1 page.
(Continued)

*Primary Examiner* — Forrest M Phillips
(74) *Attorney, Agent, or Firm* — United IP Counselors, LLC (57) ABSTRACT

The present invention provides an automobile sound insulation panel which suitably implements a lightweight sound insulation panel with an expanded sound isolation-target frequency band and improved sound isolation performance. An automobile sound insulation panel includes a first panel member, a second panel member, and an elastic sheet member positioned between the first panel member and the elastic sheet member. The elastic sheet member includes a first projection-recess part. The first panel member abuts on respective upper opening edges of a plurality of recesses that form the first projection-recess part. Individual air layers exist between the second panel member and the elastic sheet member. A continuous air layer exists between the first panel member and the elastic sheet member.

3 Claims, 5 Drawing Sheets

(56) References Cited

U.S. PATENT DOCUMENTS

| | | | | |
|---|---|---|---|---|
| 8,770,343 B2* | 7/2014 | Mathur | ............... | B32B 3/12 |
| | | | | 428/116 |
| 11,161,463 B2* | 11/2021 | Uhl | ............... | B60R 13/0861 |
| 11,168,474 B2* | 11/2021 | Koga | ............... | B32B 15/20 |
| 11,420,410 B2* | 8/2022 | Ueno | ............... | G10K 11/162 |
| 11,427,130 B2* | 8/2022 | Jeon | ............... | B32B 38/06 |
| 11,434,819 B2* | 9/2022 | Murugappan | ......... | F04D 29/545 |
| 11,514,879 B2* | 11/2022 | Honji | ............... | G10K 11/162 |
| 11,524,792 B2* | 12/2022 | Simon | ............... | B64D 29/00 |
| 11,626,094 B2* | 4/2023 | Lee | ............... | G10K 11/162 |
| | | | | 181/292 |
| 2012/0125710 A1* | 5/2012 | Fisk | ............... | B32B 15/043 |
| | | | | 181/290 |
| 2013/0133978 A1* | 5/2013 | Borroni | ............... | B32B 5/022 |
| | | | | 181/291 |
| 2013/0186707 A1* | 7/2013 | Richter | ............... | F02K 1/827 |
| | | | | 181/292 |
| 2016/0012811 A1* | 1/2016 | Yamagiwa | ............... | G10K 11/168 |
| | | | | 181/290 |
| 2019/0389170 A1* | 12/2019 | Ueno | ............... | G10K 11/162 |
| 2020/0309028 A1* | 10/2020 | Murugappan | ......... | F04D 29/545 |
| 2020/0349914 A1* | 11/2020 | Hakuta | ............... | B32B 7/08 |
| 2021/0049993 A1* | 2/2021 | Cazeaux | ............... | B64D 33/00 |

FOREIGN PATENT DOCUMENTS

| | | |
|---|---|---|
| JP | 2015-074358 A | 4/2015 |
| JP | 2017-151325 A | 8/2017 |
| WO | WO-2022129778 A1 * | 6/2022 |

OTHER PUBLICATIONS

Extended European Search Report of corresponding European patent application No. 18934661.2 dated Mar. 21, 2022, 7 pages.

* cited by examiner

AUTOMOBILE SOUND INSULATION PANEL

CROSS-REFERENCE TO RELATED APPLICATIONS

This application is a National Stage Entry application of PCT International Application No. PCT/JP2018/035328, filed on Sep. 25, 2018, the entire contents of which are hereby incorporated by reference.

BACKGROUND

1. Technical Field

The present invention relates to an automobile sound insulation panel disposed at a site where sound isolation is needed, such as the floor of an automobile. In particular, the present invention relates to an automobile sound insulation panel which suitably implements a lightweight sound insulation panel with an expanded sound isolation-target frequency band and improved sound isolation performance.

2. Description of the Background

A sound insulation panel is disposed at a site in an automobile where sound isolation is needed, for example, a floor. A specific structure of the sound insulation panel of this type is disclosed in, for example, Japanese Unexamined Patent Application Publication No. 2017-151325 (hereinafter referred to as "Patent Literature 1").

The sound insulation panel disclosed in Patent Literature 1 (hereinafter referred to as "the conventional sound insulation panel") includes a hollow plate-like resin structure (10). The resin structure (10) includes a plurality of cells (S) juxtaposed to one another inside the resin structure (10), and communication holes (15) respectively communicating with the cells (S). The communication holes (15) and corresponding cells (S) provide the Helmholtz resonance.

In the conventional sound insulation panel, a sheet member (50) is overlaid on the resin structure (10) to increase the weight of the whole sound insulation panel in an attempt to improve the sound isolation performance.

Here, since the conventional technique increases the weight of the whole sound insulation panel by overlaying the sheet member (50) as means of improving the sound isolation performance, a reduction in weight of the whole sound insulation panel is hardly achieved.

Additionally, in the conventional sound insulation panel, the overlaid sheet member (50) blocks the opening of each communication hole (15). This reduces the resonance of the Helmholtz resonance. Thus, the conventional sound insulation panel fails to effectively exhibit the sound insulation effect of the Helmholtz resonance. That is, the conventional technique fails to provide a sound insulation panel with improved sound isolation performance.

Furthermore, while the conventional sound insulation panel is expected to exhibit the sound insulation effect by the membrane vibration of the sheet member (50) in the vicinity of the communication holes (15), it is difficult to control the vibration frequency of the membrane vibration. That is, the conventional technique fails to provide a sound insulation panel which supports sound isolation over a wide frequency band.

Note that, the numbers in parentheses in the foregoing are the reference characters used in Patent Literature 1.

BRIEF SUMMARY

The present invention has been made to solve the problems above, and an object thereof is to provide an automobile sound insulation panel which suitably implements a lightweight sound insulation panel with an expanded sound isolation-target frequency band and improved sound isolation performance.

In order to achieve the object, the present invention provides an automobile sound insulation panel including: a first panel member, a second panel member positioned above the first panel member; and an elastic sheet member positioned between the first panel member and the second panel member. The elastic sheet member includes a first projection-recess part formed of a plurality of projections and recesses, the second panel member abutting on respective upper opening edges of the plurality of recesses forming the first projection-recess part. The first panel member includes a second projection-recess part formed of a plurality of projections and recesses, respective upper end surfaces of the plurality of projections forming the second projection-recess part abutting on the elastic sheet member. Between the second panel member and the elastic sheet member, respective units of inner space of the plurality of recesses exist as individual air layers independent of one another. Between the first panel member and the elastic sheet member, a plurality of void parts each positioned between two adjacent ones of the plurality of projections are successively provided, to form a continuous air layer greater in volume than the individual air layers.

In the present invention, a bottom of each of the recesses of the elastic sheet member may function as a vibration membrane which is capable of freely vibrating.

In the present invention, the automobile sound insulation panel further includes communication holes communicating with the individual air layers or the continuous air layer. Each of the communication holes and each of the individual air layers or the continuous air layer form a Helmholtz resonator.

The specific structure of the present invention is, as described above, an automobile sound insulation panel that includes a first panel member, a second panel member, and an elastic sheet member positioned between the first panel member and the second panel member. The elastic sheet member includes a first projection-recess part formed of a plurality of projections and recesses. The first panel member abuts on respective upper opening edges of the plurality of recesses that form the first projection-recess part. Between the second panel member and the elastic sheet member, individual air layers exist. Between the first panel member and the elastic sheet member, a continuous air layer exists. This structure brings about the following <<Operation A>> and <<Operation B>>, suitably providing an automobile sound insulation panel which suitably implements a lightweight sound insulation panel with an expanded sound isolation-target frequency band and improved sound isolation performance.

<<Operation A>>

The bottom of each recess of the elastic sheet member functioning as a vibration membrane, which can freely vibrate, effectively exhibits the sound insulation effect of the membrane vibration. The sound insulation effect surpassing the mass law is obtained without the necessity of, for example, increasing the weight of the second panel member. Furthermore, the vibration membrane can isolate sounds of a low frequency band.

<<Operation B>>

Provision of the communication holes that communicate with the individual air layers or the continuous air layer allows the communication holes and the individual air layers or the continuous air layer to exhibit the Helmholtz resonance. A combination of the resonance frequency and the n-th order resonance of the vibration membrane can address to sound isolation of a wider frequency range.

<<Operation C>>

When the Helmholtz resonance by the communication holes and the individual air layers is desired, the communication holes should be provided at the second panel member; when the Helmholtz resonance by the communication holes and the continuous air layer is desired, the communication holes should be provided at the first panel member. In these cases, no other panel member is stacked on the first panel member or the second panel member. Accordingly, the openings of the communication holes will not be closed and the sound insulation effect by the Helmholtz resonance is effectively exhibited.

DETAILED DESCRIPTION

In the following, with reference to the accompanying drawings, a description will be given of the best mode for carrying out the present invention.

Figure 1A:
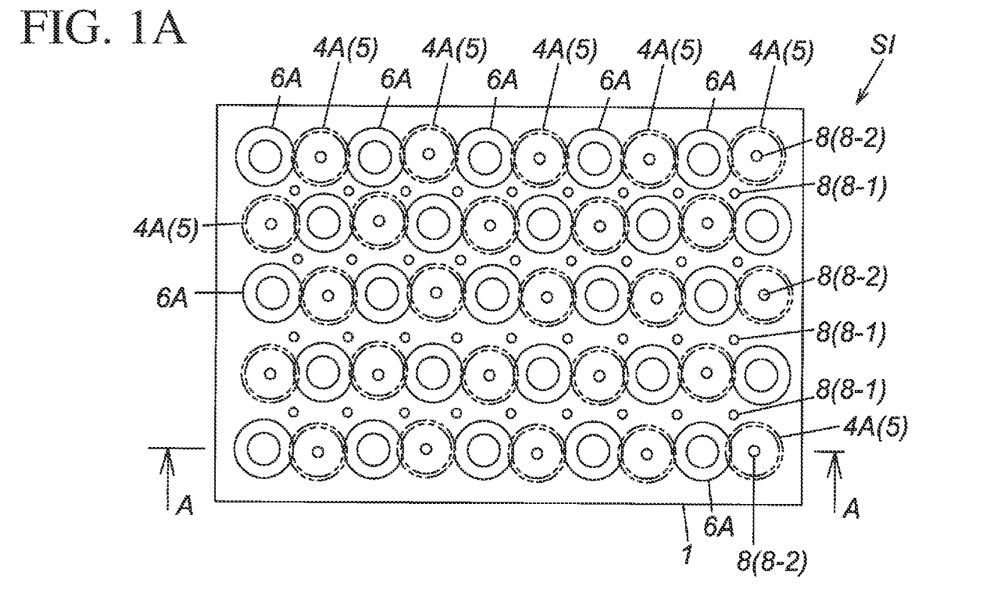
FIG. 1A is a plan view of an automobile sound insulation panel to which the present invention is applied.
Figure 1B:
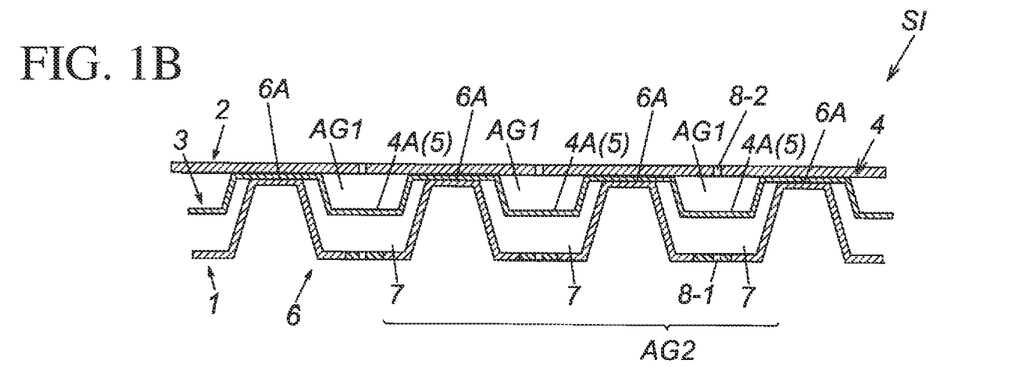
FIG. 1B is a cross-sectional view taken on arrow A in FIG. 1A.
Figure 2A:
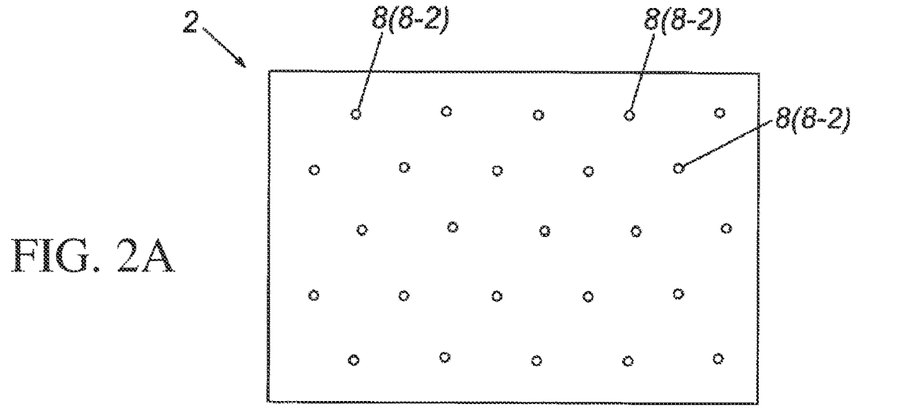
FIG. 2A is a plan view of a second panel member included in the automobile sound insulation panel in FIG. 1.
Figure 2B:
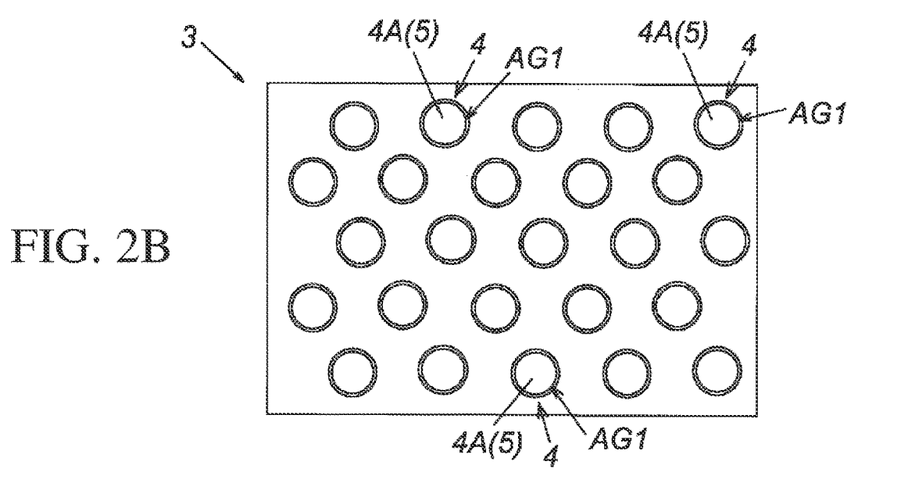
FIG. 2B is a plan view of an elastic sheet member included in the automobile panel.
Figure 2C:
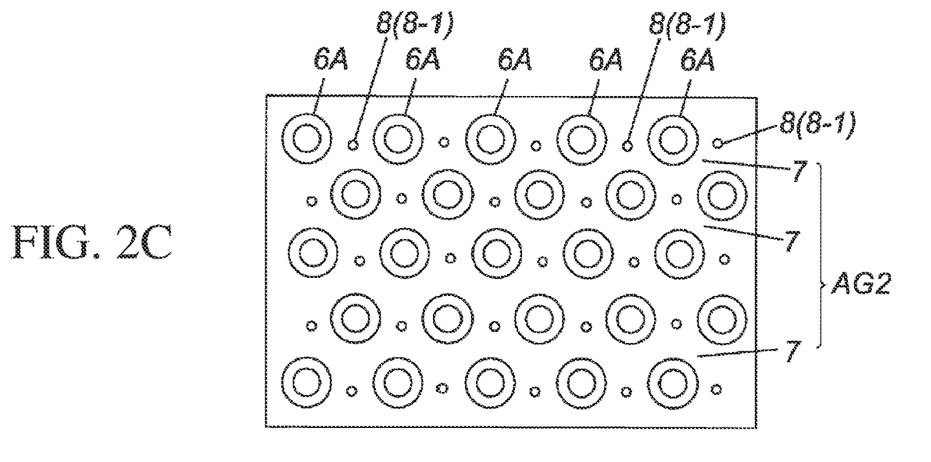
FIG. 2C is a plan view of a first panel member included in the automobile panel member.
Figure 3A:
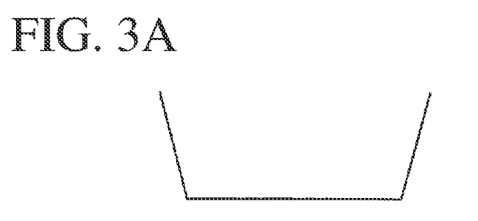
FIG. 3 is an explanatory illustration of a variation of the shape of recesses that form a first projection-recess part.
Figure 3B:
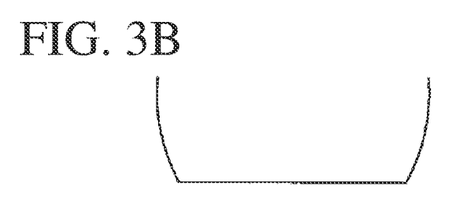
Figure 3C:
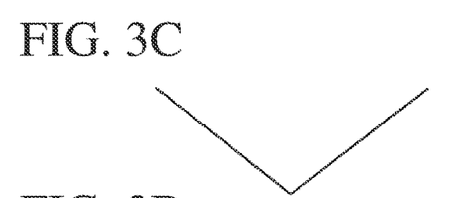
Figure 3D:
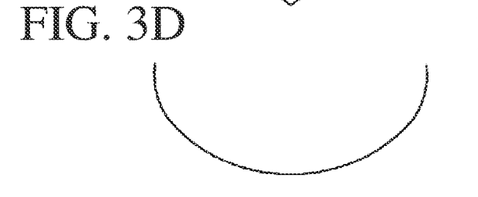
Figure 3E:
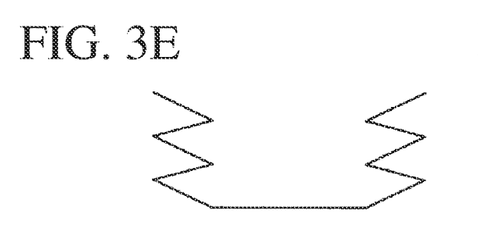
Figure 3F:
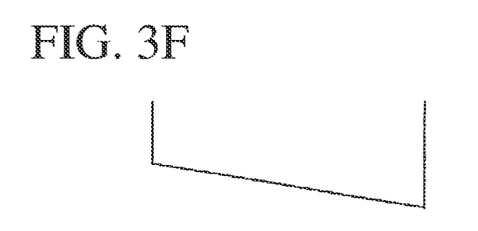
Figure 3H:
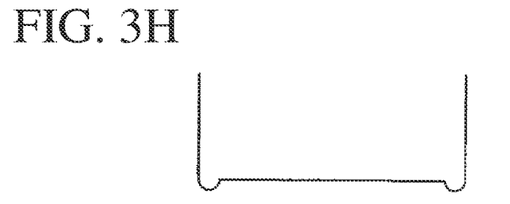
Figure 3I:
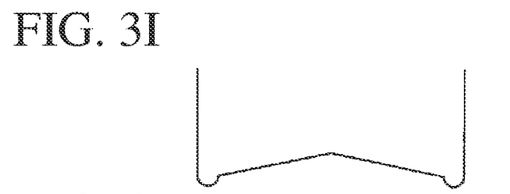
Figure 3J:
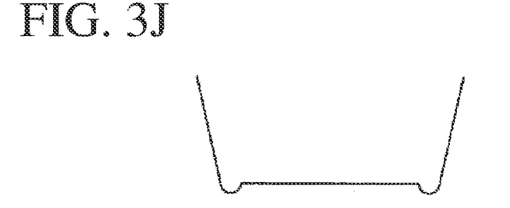
Figure 3K:
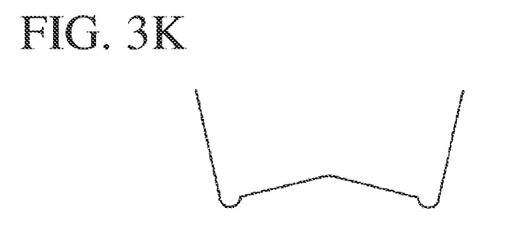

FIG. 1A is a plan view of an automobile sound insulation panel to which the present invention is applied. FIG. 1B is a cross-sectional view taken on arrow A in FIG. 1A. FIG. 2A is a plan view of a second panel member included in the automobile sound insulation panel in FIG. 1. FIG. 2B is a plan view of an elastic sheet member included in the automobile panel. FIG. 2C is a plan view of a first panel member included in the automobile panel member.

With reference to FIGS. 1A and 1B, an automobile sound insulation panel SI according to the present embodiment includes: a first panel member 1; a second panel member 2 positioned above the first panel member 1; and an elastic sheet member 3 positioned between the first panel member 1 and the second panel member 2.

<<Details of Elastic Sheet Member 3>>

The elastic sheet member 3 includes a first projection-recess part 4 formed of a plurality of projections and recesses. The second panel member 2 abuts on the upper opening edge of each of the plurality of recesses 4A of the first projection-recess part 4.

Respective units of inner space of the recesses 4A are individual air layers AG1 (first air layers) independent of one another. The opening at the upper plane of each recess 4A is positioned on the second panel member 2 side; and the individual air layer AG1 is the inner space of each recess 4A.

Therefore, there are a plurality of individual air layers AG1 between the elastic sheet member 3 and the second panel member 2.

The bottom of each recess 4A and its periphery function as a vibration membrane 5 (a first vibration membrane) which can freely vibrate by any sound energy such as noises. Thus, the automobile sound insulation panel SI according to the present embodiment is capable of exhibiting the sound insulation effect surpassing the mass law without the necessity of, for example, increasing the weight of the second panel member 2. Furthermore, the vibration membranes 5 can isolate sounds particularly of a low frequency band by their vibrations.

As means for realizing the function as the vibration membranes 5 in the elastic sheet member 3, the elastic sheet member 3 is formed of, for example, an elastic material such as a rubber material, an elastomer resin material or the like. In this case, the whole elastic sheet member 3 may be formed of an elastic material. Alternatively, out of the whole elastic sheet member 3, particularly the sites which function as the vibration membranes 5, that is, the bottom and its periphery of each recess 4A may be partially formed of an elastic material.

The shape of each recess 4A including the vibration membrane 5 may be changed as appropriate as necessary, so as to support the sound isolation-target frequency band. For example, the recess 4A may have the shape in FIGS. 3A to 3K.

With reference to FIG. 2B, in the automobile sound insulation panel SI according to the present embodiment, as a specific structure example of the first projection-recess part 4 in the elastic sheet member 3, the recesses 4A of an identical size and shape successively provided by a predetermined pitch. The present invention is not limited thereto, and the recesses 4A may be varied in size, shape or pitch.

<<First Panel Member 1>>

The first panel member 1 includes a second projection-recess part 6 formed of a plurality of projections and recesses. The upper end surfaces of the plurality of projections 6A that form the second projection-recess part 6 abut on the elastic sheet member 3.

A void part 7 is provided between two adjacent projections 6A, 6A out of the plurality of projections 6A. A plurality of such void parts 7 are successively provided, to form a continuous air layer AG2 (a second air layer) which is greater in volume than the individual air layers AG1.

Each void part 7 is positioned between the first panel member 1 and the elastic sheet member 3. Accordingly, the continuous air layer AG2 formed of the plurality of void parts 7 is provided between the rust panel member 1 and the elastic sheet member 3.

In the automobile sound insulation panel SI according to the present embodiment, a specific exemplary shape of each projection 6A is a truncated cone. The upper base surface of the truncated cone as the upper surface abuts on the elastic sheet member 3. Thus, the projections 6A support the whole elastic sheet member 3.

The shape of each projection 6A is not specified to the truncated cone. While not illustrated, for example, the shape of each projection 6A may be a circular cylinder or a circular column, or a polygonal cylinder or a polygonal column (a triangular cylinder, a triangular column, a quadrangular column, a quadrangular cylinder). Alternatively, a stepped projection may be employed. The shape of each projection 6A can be changed as appropriate as necessary.

The first panel member 1 may be formed of relatively hard resin. When the first panel member 1 is formed using a mold assembly, the taper of the truncated cone-shaped projection 6A can function as the draft gradient in removing the first panel member 1 from the mold assembly.

With reference to FIGS. 1A, 1B, and 2C, a plurality of communication holes 8 are formed at the first panel member 1 in the automobile sound insulation panel SI according to the present embodiment. The communication holes 8 (hereinafter referred to as "the first communication holes 8-1") of the first panel member 1 are positioned among the projections 6A, and penetrate through the front and back surfaces of the first panel member 1 to communicate with the continuous air layer AG2.

In the automobile sound insulation panel SI according to the present embodiment, the plurality of first communication holes 8-1 and the continuous air layer AG2 form a first Helmholtz resonator. The resonance frequency of the first Helmholtz resonator is uniquely determined by the dimension and disposition interval (pitch) of the first communication holes 8-1 and the volume of the continuous air layer AG2.

Accordingly, in the automobile sound insulation panel SI according to the present embodiment, for example, the resonance frequency of the first Helmholtz resonator can be adjusted (tuned) by changing the volume of the continuous air layer AG2, the dimension of the first communication holes 8-1, or the number or disposition interval of the first communication holes 8-1.

The cross-sectional shape of each of the first communication holes 8-1 is not specified to a circle, and may be any of various shapes such as, for example, a long-hole shape, a semi-circular shape, a crescent shape, and a star shape. Each first communication hole 8-1 may have an identical inner diameter from its one end to the other end, or may be formed as a stepped or tapered hole having a varying inner diameter. Furthermore, the first communication holes 8-1 may each be provided between two adjacent ones of projections 6A, 6A as in FIG. 2C or by a plurality of pieces.

<<Second Panel Member>>

The second panel member 2 is a resin plate of a predetermined thickness. The second panel member 2 also functions as a vibration membrane to exhibit the sound insulation effect. Accordingly, the material and thickness of the resin plate which is the second panel member 2 are changed as appropriate as necessary taking into consideration of the sound isolation-target frequency band.

With reference to FIGS. 1A, 1B, and 2A, in the automobile sound insulation panel SI according to the present embodiment, as a specific configuration example of the second panel member 2, the second panel member 2 also is provided with the communication holes 8. The communication holes 8 of the second panel member 2 (hereinafter referred to as "the second communication holes 8-2") penetrate through the front and back surfaces of the second panel member 2 and communicate with corresponding one of the individual air layers AG1.

That is, one second communication hole 8-2 is provided for each individual air layer AG1. In the automobile sound insulation panel SI according to the present embodiment, a plurality of second Helmholtz resonators are formed by the second communication holes 8-2 and corresponding ones of the individual air layers AG1. The resonance frequency of the second Helmholtz resonator is uniquely determined by the dimension of each second communication hole 8-2 and the volume of each individual air layer AG1.

Accordingly, in the automobile sound insulation panel SI according to the present embodiment, the resonance frequency of the second Helmholtz resonators can be adjusted (tuned) by changing the volume of the individual air layers AG1 or the dimension of the second communication holes 8-2.

Similarly to the first communication holes 8-1, the cross-sectional shape of each of the second communication holes 8-2 is not specified to a circle, and may be any of various shapes such as, for example, a long-hole shape, a semi-circular shape, a crescent shape, and a star shape. Each second communication hole 8-2 may have an identical inner diameter from its one end to the other end, or may be formed as a stepped or tapered hole of varying inner diameter. As in FIG. 1B, the second communication holes 8-2 may be formed to pass through the center of the corresponding ones of the individual air layers AG1. Alternatively, the second communication holes 8-2 may be formed to be offset by a predetermined amount from the center. Furthermore, a plurality of second communication holes 8-2 may be formed for each individual air layer AG1.

Other Embodiment

Figure 4:
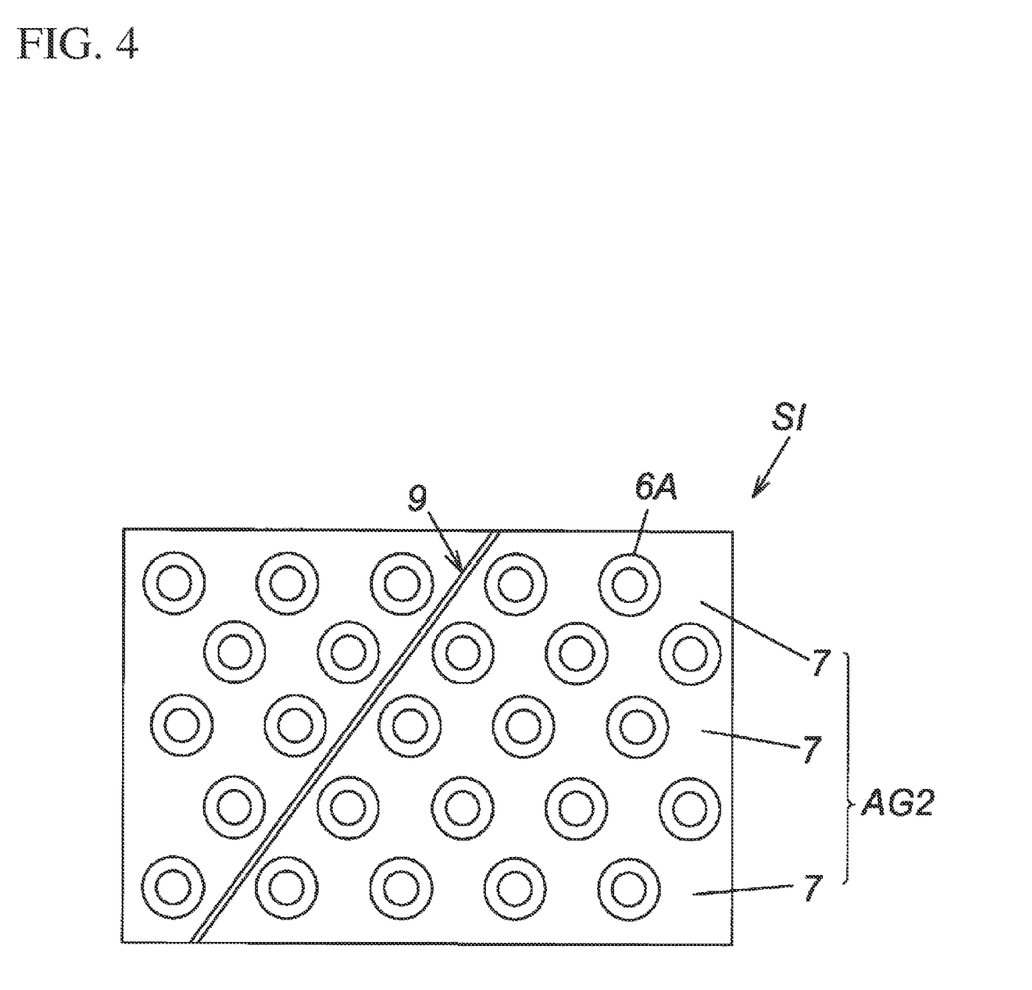
FIG. 4 is an explanatory illustration of other embodiment of the present invention.
Figure 5:
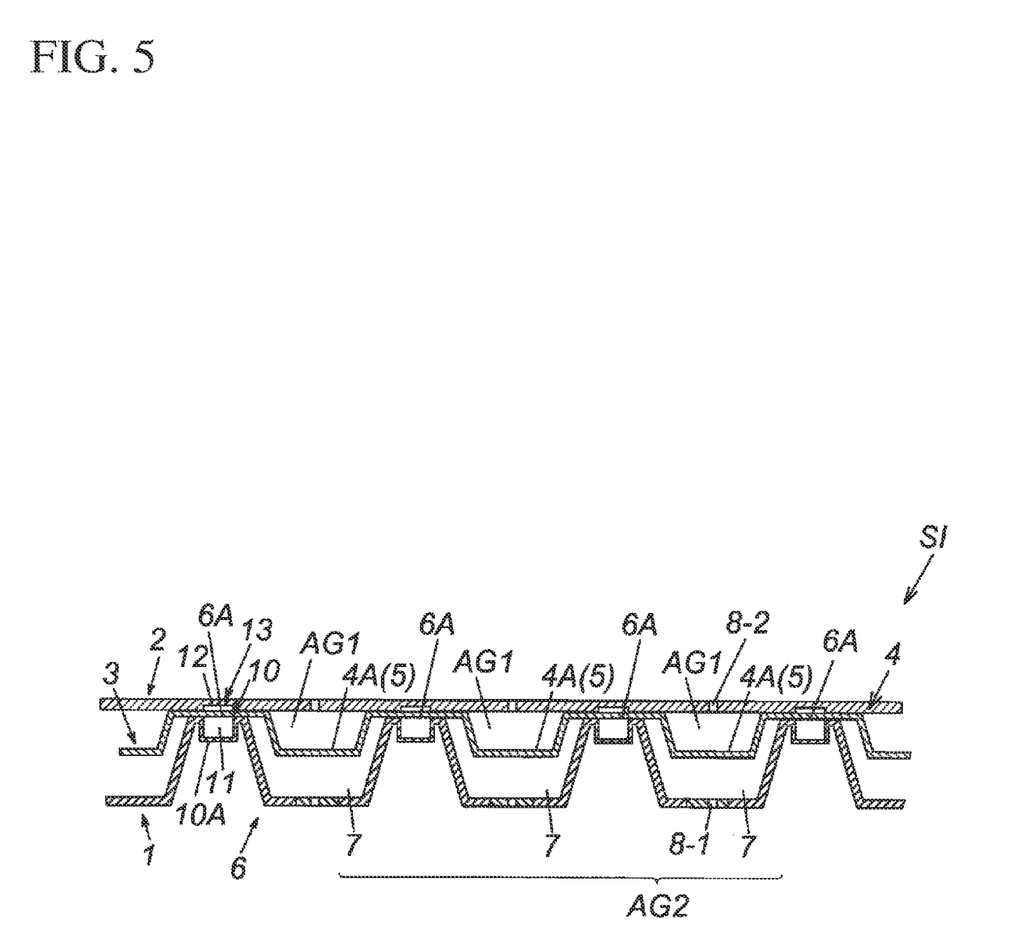
FIG. 5 is an explanatory illustration of other embodiment of the present invention.

FIGS. 4 and 5 are explanatory illustrations of an automobile sound insulation panel according to the other embodiment of the present invention. For the sake of convenience. FIG. 4 does not show the second panel member 2 and the elastic sheet member 3.

The automobile sound insulation panel SI in FIG. 1B includes one continuous air layer AG2. Here, the automobile sound insulation panel SI in FIG. 4 includes two continuous air layers AG2 which is obtained by provision of a partition 9 standing from the first panel member 1 toward the elastic sheet member 3. The partition 9 partitions the continuous air layer into two continuous air layers AG2. The number of the continuous air layers AG2 can be increased to three or more by increasing the number of the partition 9.

In the automobile sound insulation panel SI in FIG. 1B, the upper end surfaces of the projections 6A that form the second projection-recess part 6 are flat. Here, in the automobile sound insulation panel SI in FIG. 5, a third projection-recess part 10 is formed at the upper end surface of each projection 6A. The inner space of a recess 10A that forms the third projection-recess part 10 is a third air layer 11 positioned between the first panel member 1 and the elastic sheet member 3.

In the automobile sound insulation panel SI in FIG. 5, in the whole second panel member 1, concaves 12 are formed at the plane that opposes to the third air layer 11 via the elastic sheet member 3. Thus, in each range where the third air layer 11 and the concave 12 oppose to each other, part of the elastic sheet member 3 can freely vibrate as a second vibration membrane 13.

That is, the automobile sound insulation panel SI in FIG. 5 includes the second vibration membranes 13 in addition to the first vibration membranes 5. The second vibration membranes 13 also contribute to isolating sounds of a particular low frequency band by their vibrations.

<<Summary of the Foregoing>>

The automobile sound insulation panel according to the embodiments described above includes, as the specific structure, a first panel member 1, a second panel member 2, and an elastic sheet member 3 positioned between the first panel member 1 and the second panel member 2. The elastic sheet member 3 includes a first projection-recess part 4. The first panel member 1 abuts on respective upper opening edges of the plurality of recesses 4A that form the first projection-recess part 4. Between the second panel member 2 and the elastic sheet member 3, individual air layers AG1 exist.

Between the first panel member 1 and the elastic sheet member 3, a continuous air layer AG2 exists. This structure brings about the following <<Operation A>> and <<Operation B>>, suitably providing a lightweight automobile sound insulation panel with an expanded sound isolation-target frequency band and improved sound isolation performance.

<<Operation A>>

The bottom of each recess 4A of the elastic sheet member 3 functioning as a vibration membrane, which can freely vibrate, effectively exhibits the sound insulation effect of the membrane vibration. The sound insulation effect surpassing the mass law is obtained without the necessity of, for example, increasing the weight of the second panel member 2. Furthermore, the vibration membranes can isolate sounds of a low frequency band.

<<Operation B>>

Provision of the communication holes 8 (8-1, 8-2) that communicate with the individual air layers AG1 and the continuous air layer AG2 allows the communication hole 8 and the individual air layers AG1 or the continuous air layer AG2 to exhibit the Helmholtz resonance. A combination of the resonance frequency and the n-th order resonance of the vibration membrane can address to sound isolation of a wider frequency range.

<<Operation C>>

When the Helmholtz resonance by the communication holes 8 (8-1) and the individual air layers AG1 is desired, the communication holes 8 (8-1) should be provided at the second panel member 2 when the Helmholtz resonance by the communication holes 8 (8-2) and the continuous air layer AG2 is desired, the communication holes 8 (8-2) should be provided at the first panel member 1. In these cases, no other panel member is stacked on the first panel member 1 or the second panel member 2. Accordingly, the openings of the communication holes 8 (8-1, 8-2) will not be closed and the sound insulation effect by the Helmholtz resonance is effectively exhibited.

The present invention is not limited to the embodiment described above, and various modifications can be made by a person skilled in the art within the technical idea of the present invention. For example, an embodiment omitting the communication holes 8 may be made.

REFERENCE SIGNS LIST

1 first panel member
2 second panel member
3 elastic sheet member
4 first projection-recess part
4A recess of first projection-recess part
5 vibration membrane (first vibration membrane)
6 second projection-recess part
6A projection of second projection-recess part
7 void part
8 communication hole
8-1 first communication hole
8-2 second communication hole
9 partition
10 third projection-recess part
10A recess of third projection-recess part
11 third air layer
12 concave
13 second vibration membrane
AG1 individual air layer (first air layer)
AG2 continuous air layer (second air layer)
SI automobile sound insulation panel

The invention claimed is:

1. An automobile sound insulation panel comprising:
a first panel member;
a second panel member positioned above the first panel member; and
an elastic sheet member positioned between the first panel member and the second panel member, wherein
the elastic sheet member includes a first projection-recess part formed of a plurality of projections and recesses, the second panel member abutting on respective upper opening edges of the plurality of recesses forming the first projection-recess part,
the first panel member includes a second projection-recess part formed of a plurality of projections and recesses, respective upper end surfaces of the plurality of projections forming the second projection-recess part abutting on the elastic sheet member, such that the plurality of projections and recesses of the first projection-recess part are nested within the plurality of projections and recesses of the second projection-recess part,
between the second panel member and the elastic sheet member, respective units of inner space of the plurality of recesses exist as individual air layers independent of one another,
between the first panel member and the elastic sheet member, a plurality of void parts each positioned between two adjacent ones of the plurality of projections are successively provided, to form a continuous air layer greater in volume than the individual air layers, and
a bottom of each of the recesses of the elastic sheet member serves as a vibration membrane which is configured to freely vibrate.

2. The automobile sound insulation panel according to claim 1, further comprising communication holes communicating with the individual air layers or the continuous air layer, wherein each of the communication holes and each of the individual air layers or the continuous air layer form a Helmholtz resonator.

3. The automobile sound insulation panel according to claim 1, further comprising a third projection-recess part formed at upper-end surfaces of projections of the plurality of projections and recesses of the second projection-recess part, the third projection-recess part defining a third air layer between the first panel member and the elastic sheet member where projections of the third projection-recess part coincide with concaves formed in the second panel member.

* * * * *